United States Patent [19]
Schuchman et al.

[11] Patent Number: 5,283,780
[45] Date of Patent: Feb. 1, 1994

[54] DIGITAL AUDIO BROADCASTING SYSTEM

[75] Inventors: Leonard Schuchman, Potomac; John E. Miller, Wheaton, both of Md.; Ronald Bruno, Arlington, Va.

[73] Assignee: Stanford Telecommunications, Inc., Santa Clara, Calif.

[21] Appl. No.: 598,396

[22] Filed: Oct. 18, 1990

[51] Int. Cl.$^5$ ............................................... H04J 4/00
[52] U.S. Cl. ........................................ 370/50; 371/43; 381/2; 455/65; 455/257; 455/260; 375/97
[58] Field of Search ................. 370/50, 3, 70, 120, 370/122, 69.1; 371/43, 1; 380/32, 34, 36; 375/39, 58, 97, 48, 11, 23, 101, 88, 14, 13, 97; 455/65, 205, 158, 164, 168, 112, 165, 257, 258, 259, 260; 381/2

[56] References Cited

U.S. PATENT DOCUMENTS

| | | | |
|---|---|---|---|
| 4,393,456 | 7/1983 | Marshall, Jr. ........................ | 370/50 |
| 4,625,331 | 11/1986 | Richardson et al. ................ | 455/260 |
| 4,703,520 | 10/1987 | Rozanski, Jr. et al. ............. | 455/260 |
| 4,704,715 | 11/1987 | Shibagaki et al. .................. | 370/69.1 |
| 4,715,029 | 12/1987 | Crookshanks ....................... | 370/50 |
| 4,715,029 | 12/1987 | Crookshanks ....................... | 370/70 |
| 4,754,449 | 6/1988 | Crookshanks ....................... | 370/50 |
| 4,807,253 | 2/1989 | Hagenauer et al. ................. | 371/43 |
| 4,811,424 | 3/1989 | Cox .................................... | 455/260 |
| 4,833,693 | 5/1989 | Eyuboglu ............................. | 375/14 |
| 5,023,889 | 6/1991 | Divsalar et al. ..................... | 371/43 |
| 5,048,057 | 9/1991 | Salel et al. ......................... | 375/58 |

Primary Examiner—Douglas W. Olms
Assistant Examiner—Dang Ton
Attorney, Agent, or Firm—Jim Zegeer

[57] ABSTRACT

A digital audio broadcasting system that is capable of providing a large number of high quality stereophonic channels to mobile receivers in an environment with severe multipath delay and fading. Optimum combination of frequency and time diversity to guarantee robust performance in the mobile channel, with its multipath delay and frequency-selective fading effects. The system is based upon a dynamic single channel per carrier assignment of each stereo channel to many carriers. Intersymbol interference degradations caused by multipath delay are mitigated via an adaptive equalizer in the receiver. This dynamic single channel per carrier system preserves the simplicity inherent in the single channel per carrier assignment while it incorporates the ability to address frequency-selective fading by providing substantial frequency diversity. The frequency diversity is achieved via a slow frequency hop implementation in which the assignment of a number of stereo channels to an equal number of carrier frequencies is changed periodically. The system offers the simplicity of single channel per carrier assignment of stereo channels while it achieves the powerful performance benefits of frequency diversity and adaptive equalization for the mobile channel.

14 Claims, 5 Drawing Sheets

DIGITAL AUDIO BROADCASTING SYSTEM

BACKGROUND OF THE INVENTION

The mobile channel for satellite and terrestrial digital audio broadcasting (DAB) is known to be radically affected by multipath effects that create severe degradations in signal quality that include signal fading and intersymbol interference (ISI). Fading effects on the mobile channel can be very sensitive to frequency, particularly in the urban environment. Thus, within a DAB allocated band at any instant of time, some portions of the band may be experiencing a deep fade rendering that portion of the band unusable. If a program is entirely contained in such a portion of the allocated band via single channel per carrier assignment, that program will be blacked out for the duration of the fade. The purpose of dynamic single channel per carrier system of this invention is to periodically change single channel per carrier assignments in a dynamic way such that all programs in an allocated DAB frequency band uniformly occupy the entire frequency band. In so doing, all programs are protected against frequency-selective fades in the allocated band. Moreover, by providing an optimum combination of frequency and time diversity, the dynamic single channel per carrier system ensures that up to 20% or more of the allocated band can be in deep fade without affecting the sound quality of any of the programs. Thus, the dynamic single channel per carrier system of program allocation and coding provides robust digital audio broadcasting performance in the mobile channel environment with severe frequency-selective fading.

DESCRIPTION OF THE MOBILE CHANNEL ENVIRONMENT

The design of a satellite sound broadcasting system is strongly dependent on the factors affecting the propagation characteristics on the space-to-Earth path to the mobile receiver. The propagation path is subject to attenuation by shadowing due to buildings, trees, and other foliage, and to multipath fading due to diffuse scattering from the ground and nearby obstacles such as trees and buildings. The degree of impairment to the received signal level depends on the operating frequency, the elevation angle to the satellite, and the type of environment in which the receiver is operating: whether it is an open, rural, wooded or mountainous, suburban or dense urban environment. For moderate satellite elevation angles, it is known that over large areas (of the order of several hundred wavelengths), the mean value of the field strength follows a log-normal distribution. However, within small areas (of the order of a few wavelengths), two distribution models may be applied:

Rayleigh distribution where there is no direct line-of-sight to the satellite; or Rice distribution where there is direct line-of-sight to the satellite, giving one strong dominant component of constant amplitude.

The Rayleigh fading model of the mobile channel defines a worst case phase and amplitude distortion of signals. The primary manifestation of these distortions are intersymbol interference and fading. General strategies for addressing intersymbol interference include the implementation of multiple subchannels with long symbol durations and adaptive equalization which estimates and corrects channel amplitude and phase distortions in real time. Both of these approaches utilize multipath energy for detection. The adaptive equalizer also provides some frequency diversity benefits with respect to fading. The overall strategy addressing fading is to implement the appropriate amounts of frequency diversity, time diversity and space diversity.

The detailed aspects of any approach to intersymbol interference and fading mitigation are driven by a few key parameters that characterize the mobile channel. The mechanism for creating the described signal degradations in urban and suburban mobile environments is the existence of multiple propagation paths with a) different and varying time delays, and b) different and varying Doppler shifts in frequency. Property (a) is due to the fact that the signal arriving at the receiver is typically a composite of multiple paths including the direct path as well as scatter and reflections. For a fixed receiver, the time delay of each path will typically be fixed, but for a moving receiver, the time delay will vary proportionally to the speed of the receiver parallel to the direction of each received path. Receiver motion also results in property (b), that is, a Doppler shift for each path proportional to the speed of the receiver parallel to the direction of the received path. Thus, different Doppler shifts are associated with multiple paths arriving at the receiver from different angles. The multipath propagation of the mobile channel is described by the parameters multipath time delay spread and its inverse, the correlation bandwidth. Similarly, the Doppler effect on the mobile channel is described in the parameters Doppler spread and its inverse, the correlation (or coherence) time.

FADING MITIGATION THROUGH DIVERSITY

For the satellite mobile channel where both bandwidth and power efficiency are key requirements, the primary strategy for mitigating the effects of fading is the incorporation of various amounts of frequency, time and space diversity. The typical approach toward frequency and time diversity is to first code the bits with a convolutional encoder. Frequency and time diversity are then attained by ensuring that output coded symbols that are near each other (i.e., with a few constraint lengths) are sent over the channel spaced sufficiently far in frequency and time so that the fading induced errors on nearby encoder output symbols are uncorrelated. This decorrelation of errored symbols is needed to reap the potential performance gains of the encoding/decoding process.

Frequency diversity typically uses a number of carriers spaced in frequency by an amount that equals or exceeds the correlation bandwidth of the channel. Spectrum efficiency is retained by frequency interleaving a number of separate program channels to completely fill the frequency band. Spectrum occupancy can be maximized by the use of overlapping orthogonal carriers. Independent fading of the carriers is assured if the carrier spacing equals or exceeds the channel $B_C$.

Time diversity requires an orderly scrambling of the data symbols prior to transmission and the restoration of the order at the output of the receiver. The goal of the orderly scrambling and descrambling is to transform a burst of errors that occur on the propagation channel during a deep fade into random errors at the decoder input. The duration of error bursts will typically be on the order of the channel coherence time. Thus to achieve error randomization, the interleaver must ensure that encoder output symbols that are near each other are sent over the channel separated in time by $T_C$ or greater.

Spatial diversity is based on the use of multiple receiving antennas which are spaced sufficiently far apart so that the received signals fade independently. The independently fading signals at the output of each antenna are then combined to form an output signal whose fading depth is significantly less than the fading depth of the individual signals. There are many alternatives for combining with varying degrees of effectiveness.

A typical value of delay spread in dense urban environments may range from 2 μsec to 10 μsec. Delay spreads of 1 μsec or less are more typical in suburban and rural environments. Thus, the correlation bandwidth of the mobile channel will range from roughly 100 KHz for urban environments up to 1 MHz and greater for suburban and rural environments. The 10 μsec delay spread of the urban environment defines the worst case intersymbol interference that a mobile receiver has to deal with. In addition, the correlation bandwidth determines the amount of signal bandwidth needed to provide frequency diversity. For the 100 KHz $B_C$ of the urban environment, a 10 MHz waveform provides substantial diversity. However, for the rural channel, little frequency diversity may be offered by 10 MHz. Fortunately, frequency diversity will not typically be needed in the rural environment where the direct path is expected to be unobstructed and to dominate the received signal strength.

For a vehicle speed of 100 km/hr, an L-band signal has a Doppler spread of about 275 Hz and a correlation time of 3.6 msec. Alternatively, a slow moving vehicle at 10 km/hr has a $B_D$ and $T_C$ of 27.5 Hz and 36 msec respectively. Finally, a stationary vehicle will have a Doppler spread approaching zero and a very long correlation time. The 275 Hz Doppler spread for a fast moving vehicle defines a worst case scenario for frequency acquisition. The corresponding $T_C$ of 3.6 msec defines the time over which channel coherence is maintained. Thus, it represents an upper bound on symbol duration for coherent modulation and is also the timescale over which the channel delay profile may be considered constant. $T_C$ also defines the amount of time diversity that is gained by simple symbol interleaving. If the time interval over which symbols are interleaved is large compared to $T_C$, significant diversity is achieved. Conversely, if the time interval over which symbols are interleaved is small compared to $T_C$, no diversity is achieved. Thus, with respect to achieving time diversity, the stationary and slow moving vehicles define the worst case. For a slow moving vehicle, over 360 msec of interleaving may be desirable. However, no reasonable amount of symbol interleaving can provide significant time diversity for the stationary vehicle.

The key functions of the dynamic single channel per carrier system is to mitigate the effects of fading and intersymbol interference for the mobile channel environment. Fading is addressed by a unique implementation of frequency and time diversity, and intersymbol interference is addressed via adaptive equalization at the receiver. The primary prior art alternative to dynamic single channel per carrier for digital audio broadcasting in the mobile channel according to this invention is the European-developed system named "Eureka". "Eureka" addresses fading via implementation of frequency and time diversity measures not yet fully specified, and addressed intersymbol interference by transmitting each audio channel on many subchannels so that the subchannel symbol rate is less than the coherence bandwidth of the mobile channel. See the paper by LeFlock et al. "Digital Sound Broadcasting To Mobile Receivers" published in IEEE Transactions on Consumer Electronics, Vol. 35, No. 3, August 1989 and incorporated herein by reference.

THE PRESENT INVENTION

The object of the present invention is to provide a digital audio broadcasting system that is capable of providing a large number of high-quality stereophonic channels to receivers, particularly mobile receivers, in an environment with severe multipath delay and fading. The system incorporates an optimum combination of frequency and time diversity to guarantee robust performance in the mobile channel, with its multipath delay and frequency-selective fading effects. The system is based upon a dynamic single channel per carrier assignment of each stereo channel to many carriers. Intersymbol interference degradations caused by multipath delay are mitigated via an adaptive equalizer in the receiver. This system preserves the simplicity inherent in the assignment while it incorporates the ability to address frequency-selective fading by providing substantial frequency diversity. The frequency diversity is achieved via a slow frequency hop implementation in which the assignment of a number of stereo channels to an equal number of carrier frequencies is changed periodically. Thus, frequency diversity of a given stereo channel is achieved by broadcasting a channel for 2 msec at one frequency followed by 2 msec at another distant frequency, and so on. In this manner, each of many independent stereo channels achieve the frequency diversity associated with a wide bandwidth by hopping among an equal number carriers that fully occupy the bandwidth. Furthermore, this diversity is achieved without any bandwidth expansion of the group of stereo channels relative to fixed single channel per carrier assignment. In summation, the system of this invention offers the simplicity of single channel per carrier assignment of stereo channels while it achieves the powerful performance benefits of frequency diversity and adaptive equalization for the mobile channel.

The invention features the following:

The concept of achieving frequency diversity for a number (N) of distinct audio channels by dynamic assignment of these channels among an equal number (N) of closely spaced orthogonal carriers; the result is that a frequency diversity for each of the N audio channels is achieved commensurate with the full band occupied by the N carriers.

The details of the dynamic assignment whereby each audio channel is segmented into blocks of symbols with a time duration, $T_B$, less than the channel coherence time; block segmentation of all the audio channels is synchronous and the $i^{th}$ symbol block on each audio channel is assigned a fixed carrier frequency for the block duration; the next block ($i^{th}+1$) of each audio channel is assigned a different frequency, distant from the previous assignment.

The specific manner in which time and frequency diversity mutually support each other; that is, with N audio channels and N carriers, the time elapsed between blocks of the same channel that are transmitted at the same frequency is $NT_B$. N and $T_B$ are chosen, if possible, to ensure that $NT_B$ is large compared to the channel coherence time which guarantees that the fading of the two time-separated blocks in question will be uncorrelated; thus, frequency diversity ensures that fading of neighboring blocks is uncorrelated, and time diversity ensures that time-separated blocks will tend to be uncorrelated; furthermore, time diversity in the form of symbol interleaving/deinterleaving ensures that coded audio channel symbols that are less than N symbols apart at the interleaver input will be separated in time by $\geq T_B$ at the interleaver output. Thus, neighboring symbols will be transmitted on different blocks so errors on neighboring symbols will be uncorrelated; finally, since $T_B$ is $<T_C$, it is likely that the channel errors will be dominated by severely errored blocks; accordingly, it will be easy to identify and process such errored blocks as erasures; these latter two facts are critical for guaranteeing a highly robust error correction performance by the Vitrebi decoder.

Lastly, the receiver design for the specific dynamic single channel per carrier modulated waveform is novel in its combination of frequency hopping, audio channel tuning via PN matched filter detection, adaptive equalization, and rapid carrier phase estimation for each symbol block of the tuned audio channel.

DESCRIPTION AND OPERATION

The key features of a 33 channel dynamic single channel per carrier digital audio broadcasting system suitable for L-band as disclosed herein are as follows:

Efficient source coding/decoding at 256 Kbps to provide compact disc (CD) quality stereo channels Frequency and time diversity measures to mitigate mobile channel fading effects convolutional coding/decoding at rate $\frac{1}{2}$ and constraint length=7 interleaving (deinterleaving) of encoder (decoder) output (input) symbols achieves time diversity—block interleaver (deinterleaver) allows for correction of long duration fades segmentation of symbol stream in blocks of 1024 symbols - successive blocks are assigned widely separated carrier frequencies thereby achieving significant frequency diversity 33 stereo channels frequency hop among 33 carriers occupying a 10 MHz bandwidth - channel assignments are single channel per carrier for each 2 msec hop duration Adaptive equalization to combat intersymbol interference effects to utilize multipath energy, and to provide some frequency diversity in severe multipath environments easily accommodates over 10 $\mu$sec delay spread—avoids use of signal guard band and associated degradation incorporates periodic training sequence overhead in data stream to assure rapid signal acquisition after each frequency hop Offset QPSK modulation of the RF carrier - coherent demodulation, made feasible by adaptive equalizer, requires less energy per bit and thus less satellite power than differential QPSK modulation schemes Options for space diversity if/where required - matched filter detection of adaptive equalizer training sequence offers a novel low-cost approach to space diversity.

DESCRIPTION OF THE DRAWINGS

The above and other objects, advantages and features of the invention will become more apparent when considered with the following description and accompanying drawings wherein.

DETAILED DESCRIPTION OF THE INVENTION

Figure 1:
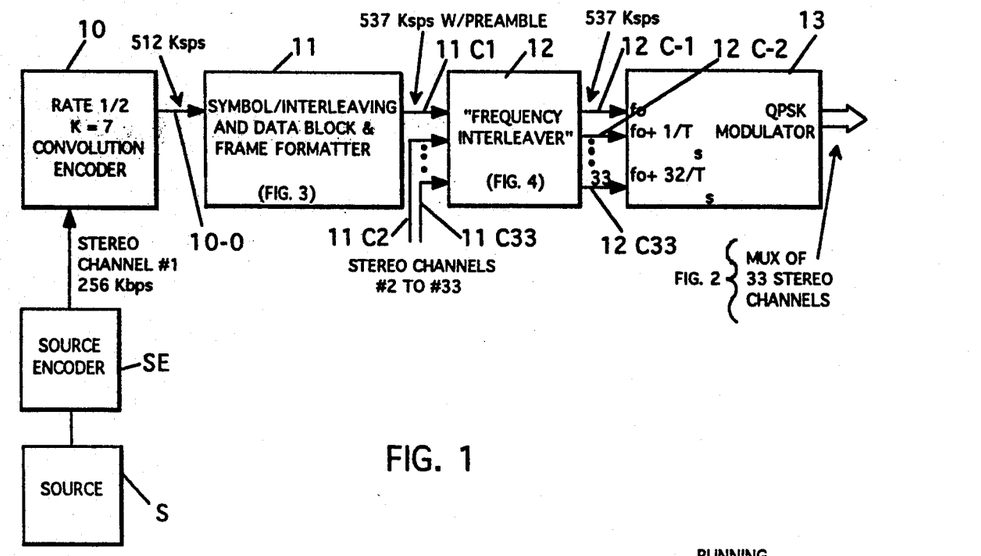
FIG. 1 is an exemplary block diagram of channel coding and multiplexing according to the invention.
Figure 4:
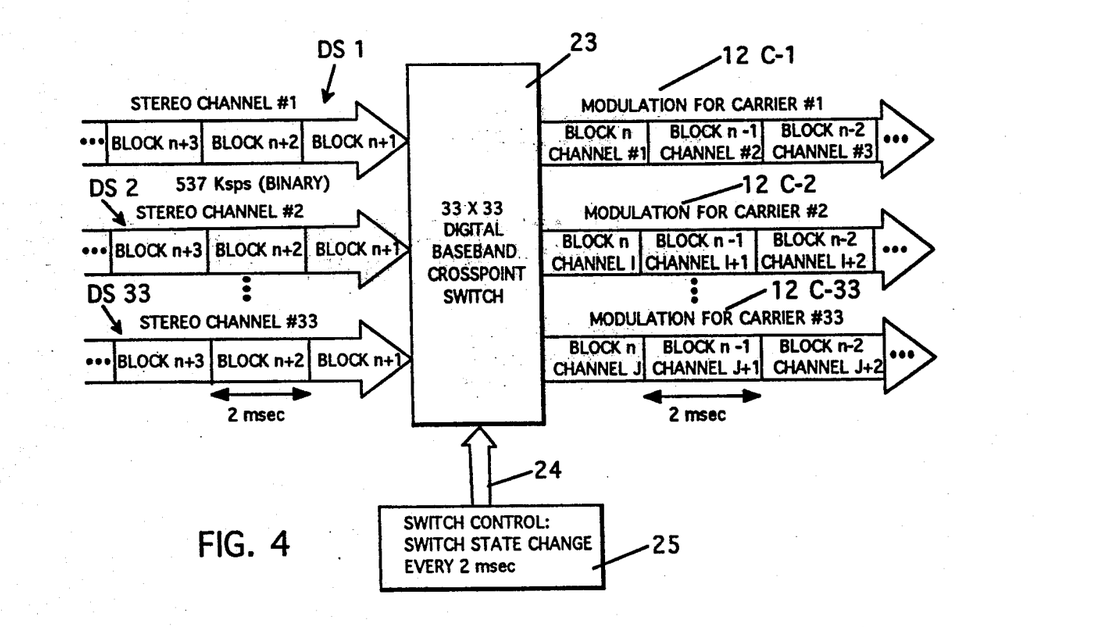
FIG. 4 is a block diagram of a frequency interleaver.
Figure 7:
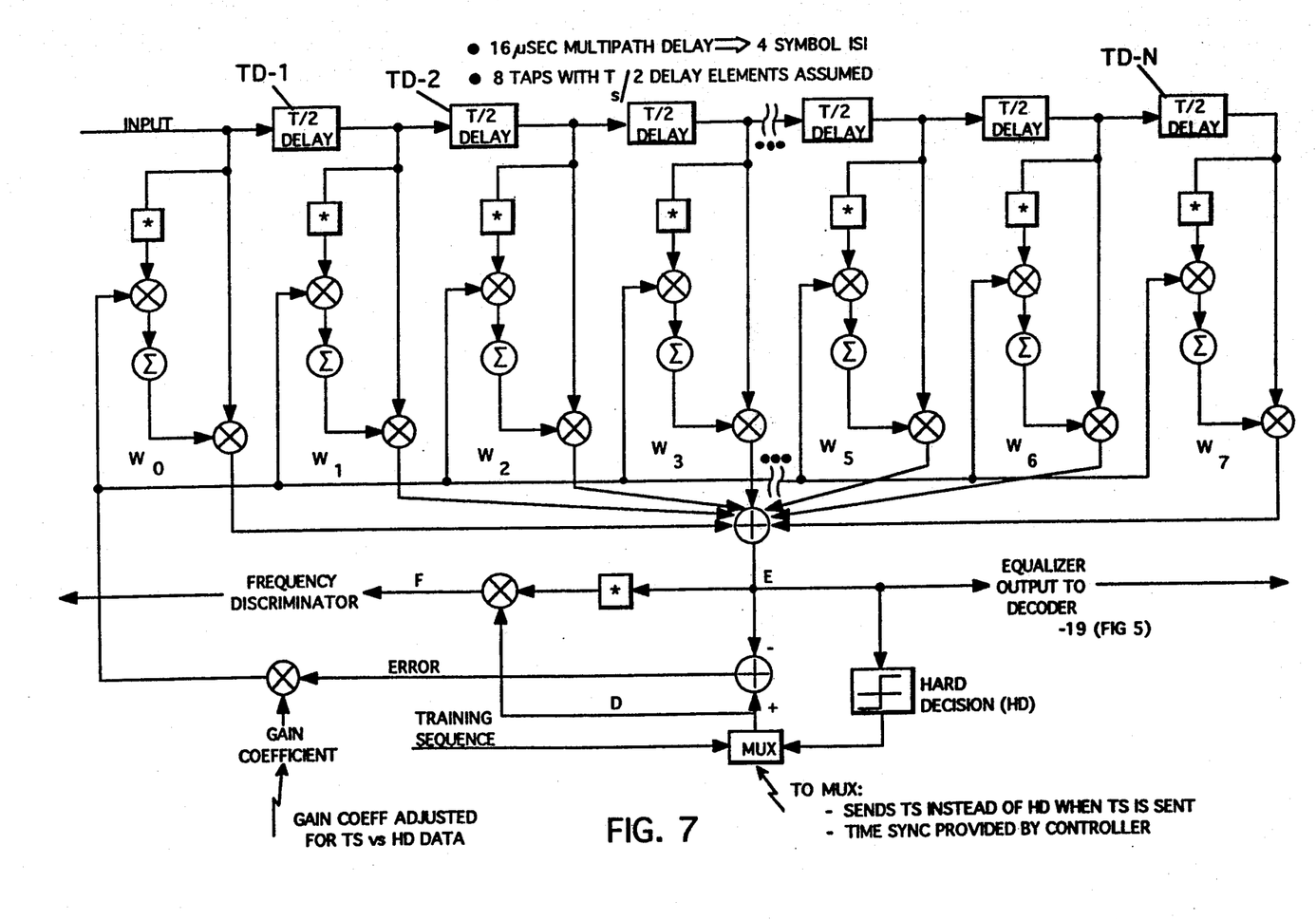
FIG. 7 is a schematic diagram of an adaptive equalizer.

FIG. 1 illustrates how 33 channels are coded and multiplexed according to the invention within a roughly 10 MHz bandwidth of an L-band broadcast beacon. Each stereo channel is encoded into a 256 Kbps data stream by a conventional source encoder. The 256 Kbps data stream for each stereo channel is then separately encoded via a rate $\frac{1}{2}$, constraint length 7 convolutional encoder 10. The output of the encoder 10 is a stream of 512K binary sps on line 10-0. This coded stream is then input to a (33,1024) block symbol interleaver 11 (shown in FIG. 3) which achieves a 2 msec time separation (1024 symbols) at the interleaver output 11-C1 for any symbols spaced <33 symbols apart at the input. The block interleaver 11 also inserts overhead symbols required by a receiver (FIG. 5) for rapid deinterleaver synchronization and fast training of the adaptive equalizer (FIG. 7). Summarizing, the functions of symbol interleaver 11 in this embodiment are:

a) WRITES DATA BY COLUMN (33 SYMBOLS) INTO A 33×1024 MATRIX
b) 1024 IS THE DATA BLOCK SIZE (W/O PREAMBLE)
c) 33×1024 IS THE DATA FRAME SIZE (W/O PREAMBLES)
d) $\simeq$50 BIT TRAINING SEQUENCE (TS) PREAMBLE FOR EACH BLOCK As diagrammatically indicated in FIG. 1, each channel has a separate convolution encoder 10 and symbol interleaver 11. The outputs of the symbol interleavers are 11C-1, 11C-2 . . . 11C-33, one for each channel, respectively, and they are supplied to "frequency" interleaver 12 (shown in FIG. 4). Features and characteristics of the "frequency" interleaver 12 in this embodiment are:

a) 33 STEREO CHANNELS HOP AMONG 33 ORTHOGONAL RF CARRIERS
b) SINGLE BLOCK OF DATA IS SENT DURING A SINGLE FREQUENCY HOP
c) ADJACENT BLOCKS ARE WIDELY SEPARATED IN FREQUENCY
d) FREQUENCY HOP SEQUENCE HAS A PERIOD OF 33

The output blocks of 1024 symbols (plus overhead) out of the interleaver 11 then modulate one of 33 orthogonal carriers. The spacing of the carrier frequency assures independent fading for transmission of sequential symbol blocks. In fact, in the system illustrated, the spacing of carrier frequencies is over 250 KHz so that for a channel with a 10 $\mu$sec delay spread (correlation bandwidth=100 KHz), the fading on all 33 carriers should be uncorrelated. Thus, if sequential symbol blocks of a stereo channel hop among all 33 carriers, a full 66 msec elapse between the time one block of data from a given stereo channel is transmitted on a chosen carrier frequency, and the next block of data from the same stereo channel is again transmitted on the chosen frequency. In this manner, all 33 stereo channels simultaneously receive the frequency diversity associated with 10 MHz of bandwidth, and a time diversity of 66 msec for symbols transmitted on the same carrier frequency. Furthermore, this overall system is very flexible in that it can easily allow different amounts of frequency and time diversity as dictated by constraints and detailed behavior of the allocated channel. For example, a larger symbol interleaver 11, or the addition of a device that interleaves blocks of symbols could easily achieve time diversities ten times longer than 66 msec. Similarly, the approach taken toward frequency diversity can easily accommodate constraints in allocated bandwidth since the approach is applicable essentially to any chunk of allocated bandwidth over which a large number of single channel per carrier/FDM carrier waveforms is combined. The 33 output channels 12C-1, 12C-2 ... 12C-33 are supplied to QPSK modulator 13 which provides a multiplexed output of the 33 stereo channels (see FIG. 2) for broadcast by a conventional transmitter.

Figure 2:
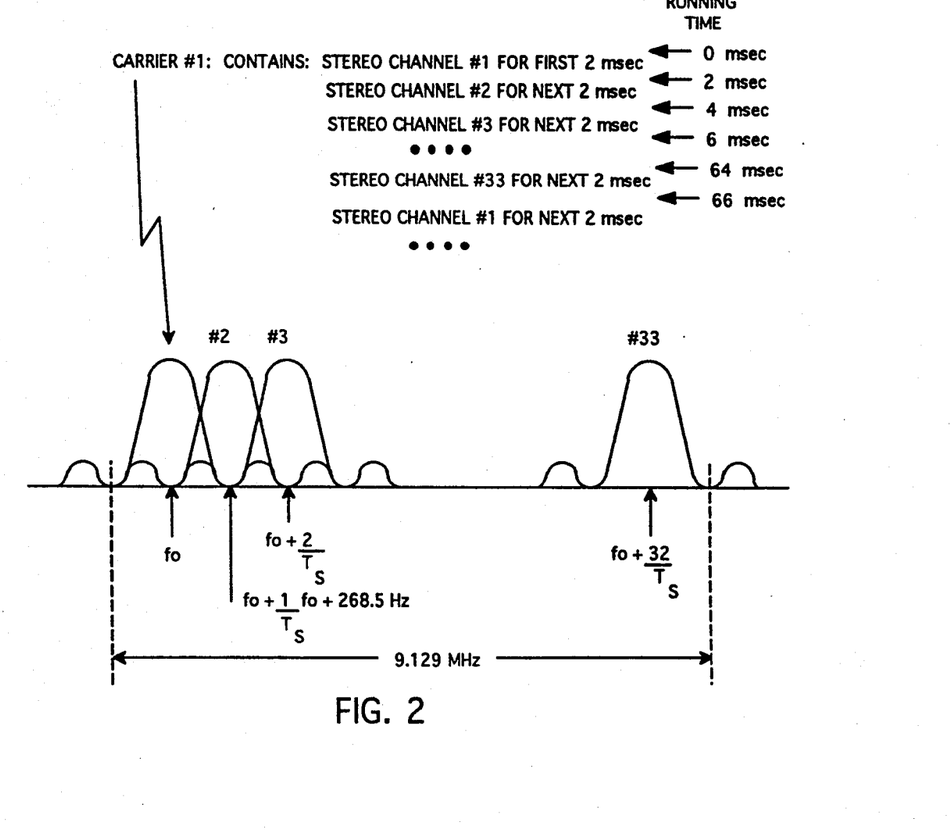
FIG. 2 is a composite waveform for 33 stereo channels illustrating a sound broadcast waveform and multiplexing.

FIG. 2 illustrates the key features of the composite waveform for 33 stereo channels. Offset QPSK modulation of the carrier is assumed. In each 2 msec interval, a block of 1074 binary symbols is sent on each carrier which corresponds to 1024 coded symbols of the stereo channel plus 50 symbols of preamble overhead. Thus, the modulation rate of each carrier, taking account of overhead, is 268.5K QPSK symbols/sec. The symbol, $T_S$, is then approximately equal to 3.7 μsec. The resulting bandwidth efficiency of this modulation scheme is excellent at roughly 0.925 information bits/Hz.

a) 2 msec BLOCK CONTAINS 1074 BINARY SYMBOLS (512 INFO BITS RATE ½ CODED AND 50 OVERHEAD BINARY SYMBOLS b) ORTHOGONAL CARRIERS W/MINIMUM SPACING c) EACH CARRIER IS OFFSET QPSK MODULATED @ 268.5k QPSK SYMB/SEC ($T_S$ = 3.724 μSEC) (256 Kbps $\xrightarrow{\frac{1}{2} \text{ CODE}}$ 512

KBINARY SYMB/SEC $\xrightarrow{+ \text{ block overhead}}$ 537 KBINARY

SYMB/SEC $\longrightarrow$ 268.5 QPSK SYMB/SEC)

d) BANDWIDTH EFFICIENCY ≈ 0.925 INFO BITS/Hz OVER THE FREQUENCY BAND

Figure 3:
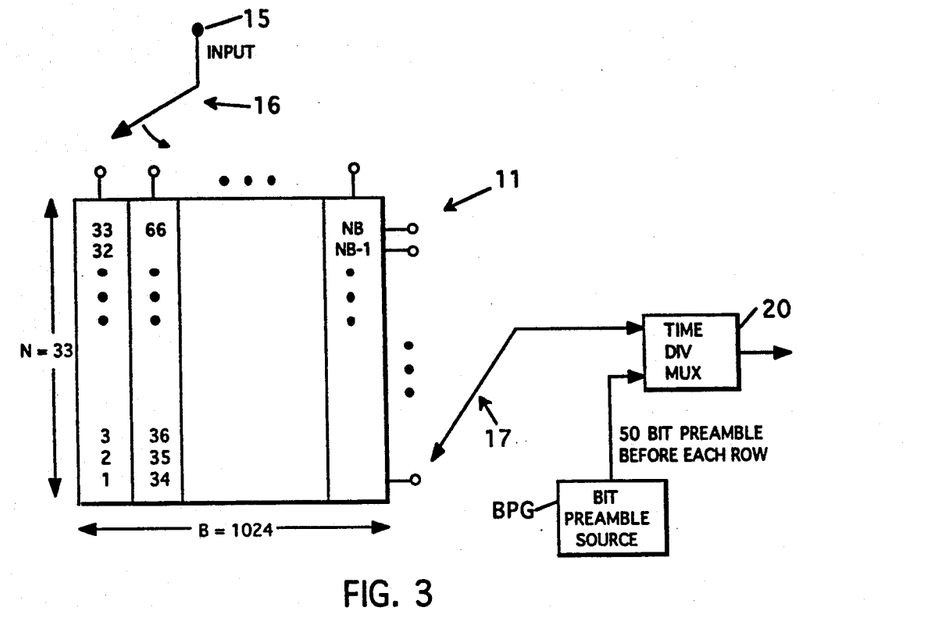
FIG. 3 is an illustration of a block symbol interleaver.

FIG. 3 is an illustration of an embodiment of the (1024, 33) symbol interleaver and data block/frame formatter 11 of FIG. 1. The input 15 is the coded data stream of a single stereo channel. The input 15 is written by columns of length 33 into a 1024×33 matrix. Electronic input switch 16 loads the interleaver 11 column-by-column and output electronic switch 17 reads out row-by-row to time division multiplexor 20. Input symbols ≦33 symbols apart are separated at the output by ≧1024 symbols. Numbers in matrix indicate order of symbols in the input coded stereo channel. When the matrix is full, it is read out by row in blocks of 1024 symbols. Each block is destined to be transmitted at a unique frequency, thereby guaranteeing independent fading of each block in the matrix. The key function of the interleaver is to assure that any two symbols that are separated by ≦1024 symbols at the deinterleaver 17 input 18 (in the receiver, FIG. 5) are separated by ≧33 symbols at the deinterleaver output. Thus, even if an entire block is lost in a catastrophic fade, the erasures going into the Viterbi decoder 18 after deinterleaving at the receiver (FIG. 5) will be separated by 33 symbols. Since 33 is much greater than the code constraint length, such an erasure pattern by itself would not result in any errors. In fact, up to 6 out of 33 blocks may be lost with less than a 3 dB performance degradation. Along with each block of 1024 symbols, a preamble of 50 symbols or so from bit preamble generator or source BPG is inserted to support rapid signal acquisition of each frequency hop. This preamble, which is inserted before each row, supports rapid training of the adaptive equalizer 21 on the receiver of FIG. 5, rapid synchronization of the block deinterleaver, and rapid carrier frequency and phase estimation. With the 50 symbol preamble, each transmitted symbol block contains 1074 symbols.

FIG. 4 is an illustration of an embodiment of the "frequency" interleaving process. The implementation is a simple 33×33 crosspoint switch 23 which routes 33 input digital streams DS-1, DS-2 ... DS-33 to 33 output streams 12C-1; 12C-2 ... 12C-33. As shown, the effect is to interleave blocks of symbols from different stereo channels on the modulation data stream for each carrier. The blocks are 1074 symbols in length with a time duration of 2 msec which results in input/output I/O symbol rates of 537 Ksps. The crosspoint switch 23 is changed every 2 msec by an input control 24 from crosspoint switch control 25 to accomplish the interleaving process according to an algorithm that maximizes the frequency diversity of nearest neighboring symbol blocks on each stereo channel. Note that neighboring blocks of the same stereo channel hop to different carriers in such a way as to maximize frequency diversity.

Figure 5:
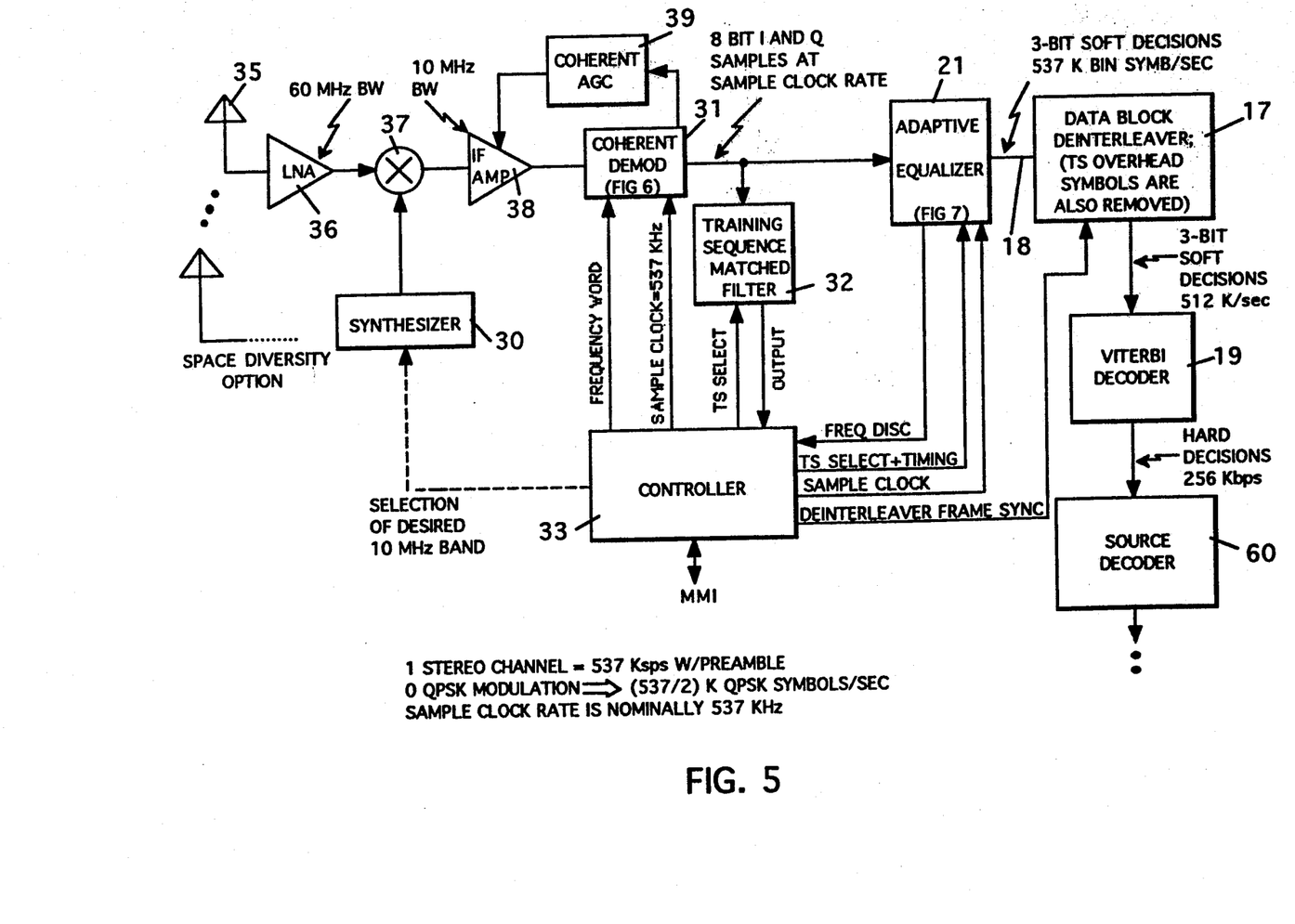
FIG. 5 is a block diagram of a sound broadcast radio receiver according to the invention.

FIG. 5 is a schematic diagram of the mobile receiver according to this invention system. The key elements of this system that relate to the acquisition and timing of a frequency hopped signal are the frequency synthesizer 30, demodulator 31, training sequence matched filter 32, controller, adaptive equalizer 21 and data block deinterleaver 17. The primary departure in receiver relative to a receiver for fixed single channel per carrier assignment of stereo channels is that here, the controller sends a frequency word to the demodulator every 2 msec which corresponds to the frequency hop sequence of the desired stereo channel. The proper timing for the hop sequence is provided by the training sequence matched filter 32, and fine frequency tuning is provided via an adaptive equalizer frequency discriminator output (see FIG. 7). Initial acquisition is accomplished by the controller 33, which selects "$T_S$ select" the training sequence matched filter in matched filter 32 that is unique to each stereo channel in the 10 MHz band. The RF stages of the receiver are conventional. Antennae 35 supplies received signals to amplifier 36 having a 60 MHz bandwidth, and its output is supplied to mixer 37, which also receives signals from synthesizer 30. Controller 33 provides selection of the desired 10 MHz band to synthesizer 30 and hence to mixer 37. IF amplifier 38 has a 10 MHz bandwidth and is supplied with an AGC signal from coherent AGC generator 39 which receives its input from coherent demodulator 31. Significant functions and features of each of the key receiver elements are discussed below.

The function of synthesizer 30 is to provide the correct mixing frequency for the desired 10 MHz band. Thus for a 60 MHz bandwidth allocation, the synthesizer 30 would need to output one of six frequencies which would translate the incoming frequency band to a standard IF (e.g., 70 MHz).

Figure 6:
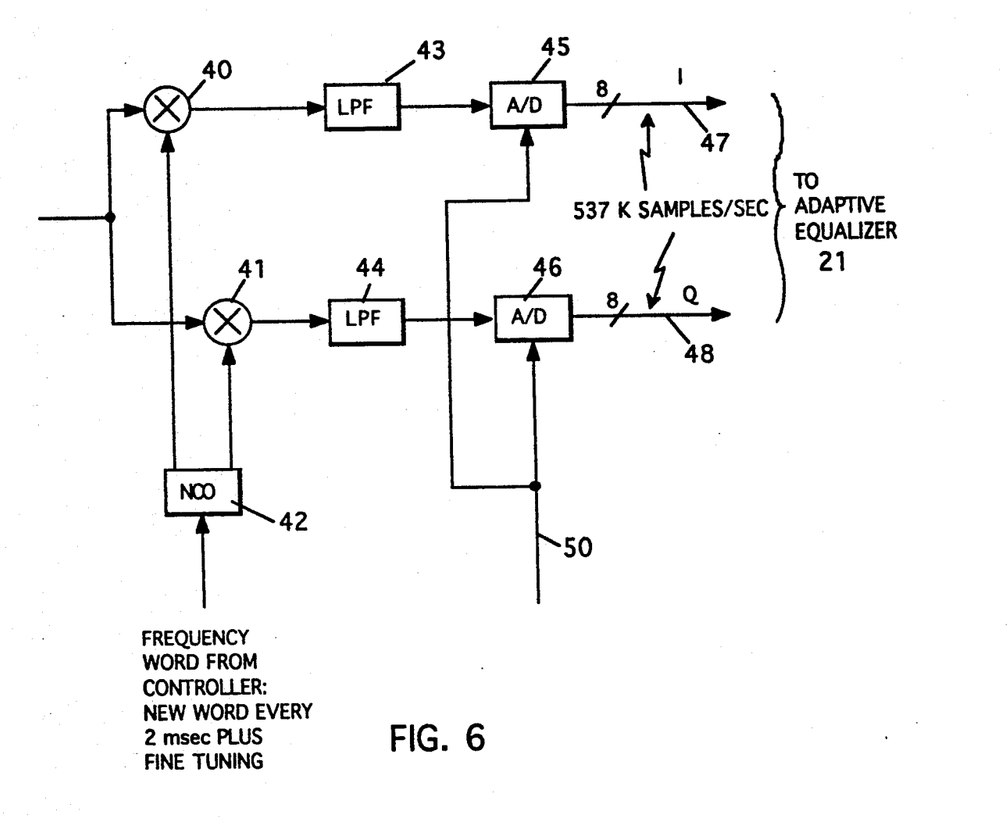
FIG. 6 is a schematic diagram of the receiver demodulator.

FIG. 6 is a simplified schematic of the receiver demodulator. The input is a bandpass signal (10 MHz) at a 70 MHz IF. The input is then separated into in phase (I) and quadrature (Q) components via mixers 40 and 41 operating at a mixing frequency provided by a numerically controlled oscillator (NCO) 42. The numerically controlled oscillator 42 follows the frequency hop sequence of the desired channel and is supplied with a new frequency word every 2 msec plus fine tuning. After the downmixing operation and low pass filtering in filters 43, 44, the desired signal is entirely contained in a bandwidth corresponding to the modulation bandwidth of a single carrier (~0.5 MHz) rather than the entire 10 MHz bandwidth as in other proposed schemes for frequency diversity. The A/D processors 45, 46 on the I and Q branches 47, 48 then supply the adaptive equalizer 21 with 8 bit samples at 537K samples per second. The sample clock on line 50 is input from the controller 33 which establishes and maintains symbol synchronization and is 537 KHz nominal.

The training sequence (TS) matched filter 32 provides the input to the controller 33 required for initial tuning of the desired stereo channel. Each stereo channel would have a unique pseudo-noise (PN) sequence with a sharply peaked autocorrelation function at zero offset and with low cross correlations with PN sequences of other stereo channels. Thus, a family of Gold codes may be used within the 50 symbols in the training sequence. The training sequence matched filter 32 output would thus indicate when the data block of a desired channel is on a given frequency by the peak in the matched filter 32 output. The TS matched filter 32 also provides a fine tuning information for symbol synchronization.

The receiver controller provides the man-machine interface MMI for the receiver and also controls signal acquisition and tracking. In a signal acquisition mode, the controller 33 orchestrates a frequency sweep by the numerically controlled oscillator 42 around a frequency corresponding to a fixed reference carrier frequency (e.g., $f_o$). It would at the same time, program the TS matched filter 32 to the specific PN sequence assigned to a desired channel. The TS matched filter 32 output would then detect the arrival of the incoming PN sequence at the chosen frequency. The level and timing of the TS matched filter 32 output would thus provide the controller 33 with the needed inputs for time synchronization of the desired channel, as well as initial frequency tuning relative to vehicle Doppler and synthesizer frequency drift. With initial tuning established, the controller 33 would initiate the frequency hop sequence of the demodulator numerically controlled oscillator 42 by sending a new frequency word every 2 msec. The controller 33 would also maintain frequency and symbol synchronization with continuous inputs from the TS matched filter 32 and the adaptive equalizer 21. Lastly, the controller 33 would provide the symbol block deinterleaver 17 with a frame sync pulse indicating the arrival of a new frame every 66 msec.

FIG. 7 is a logical schematic of the adaptive equalizer 21 in the mobile receiver to mitigate the intersymbol interference effects of delay spread. In order to accommodate roughly 16 μsec delay spread, an equalizer with 8 to 10 taps is required. The tap delays TD-1, TD-2 . . . TD-N are ½ symbol increments or slightly less than 2 μsec. The equalizer illustrated in FIG. 7 uses a least-mean-square error algorithm for setting and adjusting the tap weight coefficients. This adaptive equalizer collects multipath energy over the delayed paths to form on a best estimate (E) of symbol phase. It also provides a frequency discriminator output (F) to the controller for maintaining carrier synchronization. Unique acquisition and tracking techniques are incorporated into this design to overcome distortions of the fading multipath channel, and to achieve rapid and robust signal acquisition. One key aspect of this is its utilization of a known training sequence to rapidly adjust the equalizer tap weight coefficient to their optimum values. As mentioned previously, the training sequence is inserted as a preamble prior to each block of 1024 stereo channel symbols. It is thus the leading sequence of symbols the equalizer sees after each new frequency hop. The deinterleaver 17 of the mobile receiver is essentially a mirror image of the interleaver 11 at the transmitter. Its function is to write blocks of 1074 symbols into rows of a 1074×33 matrix and to read out the matrix by columns of 33 symbols. Together with the interleaver 11, it transforms long continuous bursts of errors on the propagation channel to single errors spaced apart at ≧33 symbols. Synchronization is provided by the controller 33 which identifies the first block of an entire frame of 35442 symbols. The deinterleaver 17 also performs the function of removing overhead symbols prior to the Viterbi decoder and source decoder 60. With 3-bit quantized symbol estimates, the memory requirement of the deinterleaver matrix is small at less than 16 Kbyte.

The novel features of the dynamic single channel per carrier system for digital audio broadcasting include the following:

The concept of achieving frequency diversity for a number (N) of distinct audio channels by dynamic assignment of these channels among an equal number (N) of closely spaced orthogonal carriers; the result is that a frequency diversity for each of the N audio channels is achieved commensurate with the full band occupied by the N carriers;

The details of the dynamic assignment whereby each audio channel is segmented into blocks of symbols with a time duration, $T_B$, less than the channel coherence time; block segmentation of all the audio channels is synchronous and the $i^{th}$ symbol block on each audio channel is assigned a fixed carrier frequency for the block duration; the next block ($i^{th}+1$) of each audio channel is assigned a different frequency, distant from the previous assignment;

The specific manner in which time and frequency diversity mutually support each other; that is, with N audio channels and N carriers, the time elapsed between blocks of the same channel that are transmitted at the same frequency is $NT_B$. N and $T_B$ are chosen, if possible, to ensure that $NT_B$ is large compared to the channel coherence time which guarantees that the fading of the two time-separated blocks in question will be uncorrelated; thus, frequency diversity ensures that fading of neighboring blocks is uncorrelated, and time diversity ensures that time-separated blocks will tend to be uncorrelated; furthermore, time diversity in the form of symbol interleaving/deinterleaving ensures that coded audio channel symbols that are less than N symbols apart at the interleaver input will be separated in time by $\geq T_B$ at the interleaver output. Thus, neighboring symbols will be transmitted on different blocks so errors on neighboring symbols will be uncorrelated; finally, since $T_B$ is $<T_C$, it is likely that the channel errors will be dominated by severely errored blocks; accordingly, it will be easy to identify and process such errored blocks as erasures; these latter two facts are critical for guaranteeing a highly robust error correction performance by the Viterbi decoder;

Lastly, the receiver design for the specific dynamic single channel per carrier modulated waveform is novel, in its combination of frequency hopping, audio channel tuning via PN matched filter detection, adaptive equalization, and rapid carrier phase estimation for each symbol block of the tuned audio channel.

It will be readily apparent to those skilled in this art from the detailed description and drawings that which is shown and described is only the preferred embodiment of the invention and the best mode contemplated for carrying out the invention. The invention, therefore, is capable of other and different embodiments, and its several details are capable of modifications in various obvious respects, all without departing from the invention. Accordingly, the drawings and description are to be regarded as illustrative in nature, and not as restrictive.

What is claimed is:

1. A digital audio broadcasting system for providing a large number N of high quality stereophonic (stereo) channels to one or more mobile receivers in an environment having multipath delay and fading comprising:
   radio broadcast means including,
   1) for each stereo channel:
      a) means for converting an input audio signal to a digital signal having a predetermined data rate,
      b) first convolution encoder means for encoding said digital signal with an error correcting code and generate a stereo channel signal,
      c) first interleaver means for receiving a stereo channel signal from said convolution encoder and interleaving successive blocks of symbols and data blocks and supplying a sequential train of interleaved data blocks of symbols, and
   2) second interleaver means for interleaving each stereo channel signal between a plurality of carrier frequencies equal in number to the number N of stereo channels, and means for periodically changing the carrier frequency of each said stereo channel, and
   3) multiplexer means for forming a composite signal of the carrier signals from said second interleaver means, and means for radio broadcasting said composite of signal carrier signals.

2. The invention defined in claim 1 wherein said c) first interleaver means includes time division multiplexing means, means connecting said sequential train of interleaved data blocks and symbols to said time division multiplexing means, and bit preamble source means connected to said time division multiplexing means so that each train of interleaved data blocks and symbols is preceded by a unique preamble word to support rapid signal acquisition of each said stereo channel.

3. The invention defined in claims 1 or 2 wherein said first interleaver means is a matrix which receives data bit blocks and symbols in sequential columns of equal length and outputs rows of data bits sequentially, one-by-one from said columns, respectively, to constitute said sequential train of interleaved data bit blocks and symbols.

4. The invention defined in claim 1 wherein said c) first interleaver means includes an interleaver matrix means, and time division multiplexing means, means connecting said sequential train of interleaved data blocks and symbols to said time division multiplexing means, and bit preamble source means connected to said time division multiplexing means so that each train of interleaved data blocks and symbols is preceded by a unique preamble word to support rapid signal acquisition of each said stereo channel, and wherein said interleaver matrix means receives data bit blocks and symbols in sequential columns of equal length and outputs rows of data bits sequentially, one-by-one from said columns, respectively, to constitute said sequential train of interleaved data bit blocks and symbols, and said second interleaver is constituted by a digital baseband crosspoint switch and receives each stereo channel s sequential train of interleaved data blocks and symbols from said first interleaver matrix means and, at a predetermined time interval, interchanging the carrier frequency of all of said stereo channels so as to interleave blocks of symbols from N different stereo channels and form a modulation data stream for each carrier, respectively.

5. The invention defined in claim 1, wherein each of said one or more receiver means includes means for receiving the radio broadcast signals and producing a signal for processing, including mixer means and means for supplying said signal for processing to said mixer means, a frequency synthesizer connected to said mixer means to provide a mixing frequency for a desired band of frequencies and to translate same to a predetermined intermediate frequency, controller means for supplying a selection signal to said frequency synthesizer to cause said mixer means to select said desired band of signals, demodulator means connected to receive said intermediate frequency, a training sequence matched filter connected to said demodulator for providing an input to said controller means for initial tuning of a desired stereo channel, an adaptive equalizer connected to said demodulator to mitigate the effects of delay spread and deinterleaver means connected to said adaptive equalizer to convert signals from said adaptive equalizer to the form of said stereo channel signals from said first encoder means and decoder means connected to said deinterleaver.

6. A digital audio broadcasting system for providing a large number N of high quality audio channels to one or more mobile receivers in an environment having multipath delay and fading comprising:
   radio broadcast means including,
   1) for each audio channel;
      a) means for converting an input audio signal to a digital signal having a predetermined data rate,
      b) convolution encoder means for encoding said digital signal with an error correcting code and generating an audio channel, c) first interleaver matrix means for receiving an audio channel from said convolution encoder and interleaving successive blocks of symbols and data blocks and supplying a sequential train of interleaved symbols and data blocks, said first interleaver matrix means including time division multiplexing means, means connecting said sequential train of interleaved data blocks and symbols to said time division multiplexing means, and bit preamble source means connected to said time division multiplexing means so that each train of interleaved data blocks and symbols is preceded by a unique preamble word to support rapid signal acquisition of each of said audio channels, and 2) second interleaver means for interleaving each audio channel signal between a plurality of carrier frequencies equal in number to the number N of audio channels, said second interleaver being constituted by a digital baseband crosspoint switch and receives each audio channel's sequential train of interleaved data blocks and symbols from said first interleaver matrix means and, at a predetermined time interval, interchanging the carrier frequency of all of said audio channels so as to interleave blocks of symbols from N different audio channel, and 3) multiplexer means for forming a composite signal of the carrier signals from said second interleaver means, and means for radio broadcasting said composite of signal carrier signals.

7. The invention defined in claim 6 wherein said first interleaver matrix means is a matrix which receives data bit blocks and symbols in sequential columns of equal length and outputs rows of data bits sequentially one-by-one from said columns, respectively, to constitute said sequential train of interleaved data bit blocks and symbols.

8. The invention defined in claim 6 wherein each of said one or more receiver means includes means for receiving the radio broadcast signals and producing a signal for processing, including mixer means and means for supplying said signal for processing to said mixer means, frequency synthesizer means connected to said mixer means to provide a mixing frequency for a desired band of frequencies and to translate same to a predetermined intermediate frequency, controller means for supplying a selection signal to said frequency synthesizer means to cause said mixer means to select said desired band of frequencies, demodulator means connected to receive said intermediate frequency, a training sequence matched filter connected to said demodulator for providing an input to said controller means for initial tuning of a desired stereo channel, an adaptive equalizer connected to said demodulator to mitigate the effects of delay spread and deinterleaver means connected to said adaptive equalizer to convert signals from said adaptive equalizer to the form of said stereo channel signals from said convolutional encoder and decoder means connected to said deinterleaver.

9. The invention defined in claim 2 wherein said second interleaver is constituted by a digital baseband crosspoint switch and receives each stereo channel's sequential train of interleaved data blocks and symbols from said first interleaver means and, at a predetermined time interval, interchanging the carrier frequency of all of said stereo channels so as to interleave blocks of symbols from N different stereo channels and form a modulation data stream for each carrier, respectively.

10. The invention defined in claim 3 wherein said second interleaver is constituted by a digital baseband crosspoint switch and receives each stereo channel's sequential train of interleaved data blocks and symbols from said first interleaver means and, at a predetermined time interval, interchanging the carrier frequency of all of said stereo channels so as to interleave blocks of symbols from N different stereo channels and form a modulation data stream for each carrier, respectively.

11. The invention defined in claim 2 wherein each of said one or more received means includes means for receiving the radio broadcast signal and producing a signal for processing, including mixer means and means for supplying said signal for processing to said mixer means, a frequency synthesizer connected to said mixer means to provide a mixing frequency for a desired band of frequencies and to translate same to a predetermined intermediate frequency, controller means for supplying a selection signal to said frequency synthesizer to cause said mixer means to select said desired band of frequencies, demodulation means connected to receive said intermediate frequency, a training sequence matched filter connected to said demodulator for providing an input to said controller means for initial tuning of a desired stereo channel, an adaptive equalizer connected to said demodulator to mitigate the effects of delay spread and deinterleaver means connected to said adaptive equalizer to convert signals from said adaptive equalizer to form of said signals from said first encoder means and decoder means connected to said deinterleaver.

12. The invention defined in claim 3 wherein each of said one or more receiver means includes means for receiving the radio broadcast signals and producing a signal for processing, including mixer means and means for supplying said signal for processing to said mixer means, a frequency synthesizer connected to said mixer means to provide a mixing frequency for a desired band of frequencies and to translate same to a predetermined intermediate frequency, controller means for supplying a selection signal to said frequency synthesizer to cause said mixer means to select said desired band of frequencies, demodulation means connected to receive said intermediate frequency, a training sequence matched filter connected to said demodulator for providing an input to said controller means for initial tuning of a desired stereo channel, an adaptive equalizer connected to said demodulator to mitigate the effects of delay spread and deinterleaver means connected to said adaptive equalizer to convert signals from said adaptive equalizer to form of said signals from said first encoder means and decoder means connected to said deinterleaver.

13. The invention defined in claim 4 wherein each of said one or more receiver means includes means for receiving the radio broadcast signals and producing a signal for processing, including mixer means and means for supplying said signal for processing to said mixer means, a frequency synthesizer connected to said mixer means to provide a mixing frequency for a desired band of frequencies and to translate same to a predetermined intermediate frequency, controller means for supplying a selection signal to said frequency synthesizer to cause said mixer means to select said desired band of frequencies, demodulation means connected to receive said intermediate frequency, a training sequence matched filter connected to said demodulator for providing an input to said controller means for initial tuning of a desired stereo channel, an adaptive equalizer connected to said demodulator to mitigate the effects of delay spread and deinterleaver means connected to said adaptive equalizer to convert signals from said adaptive equalizer to form of said signals from said first encoder means and decoder means connected to said deinterleaver.

14. A radio receiver for receiving radio broadcast signals and producing a signal for processing said radio broadcast signals being comprised of a plurality of stereo signal channels interleaved between a plurality of carrier frequencies equal in number to the number of stereo signal channels and in which the carrier frequency of each stereo signal channel is changed periodically, comprising, mixer means and means for supplying said radio broadcast signal to said mixer means, a frequency synthesizer connected to said mixer means to provide a mixing frequency for a desired band of frequencies and to translate same to a predetermined intermediate frequency, controller means for supplying a selection signal to said frequency synthesizer to cause said mixer means to select said desired band of frequencies, demodulator means connected to receive said intermediate frequency, a training sequence matched filter connected to said demodulator for providing an input to said controller means for initial tuning of a desired stereo signal channel, an adaptive equalizer connected to said demodulator to mitigate the effects of delay spread and deinterleaver means connected to said adaptive equalizer to convert signals from said adaptive equalizer to said desired stereo signal channels.

* * * * *